Patented Mar. 30, 1943

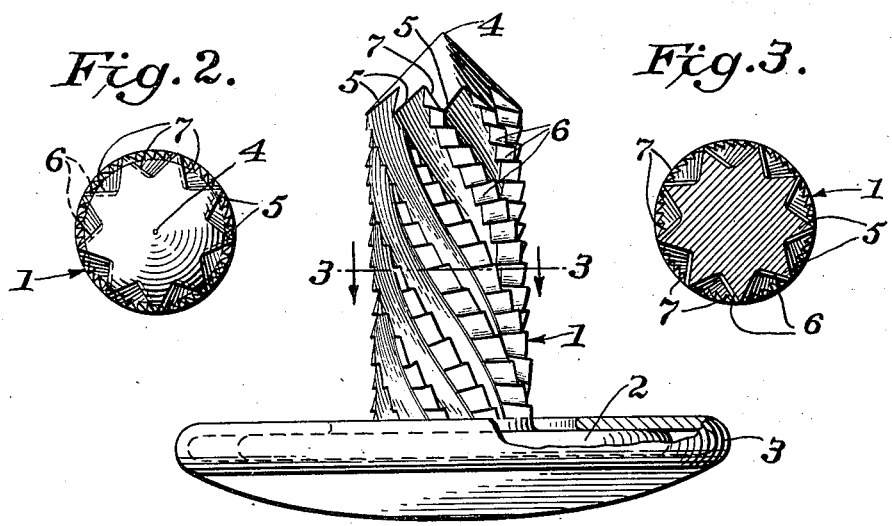
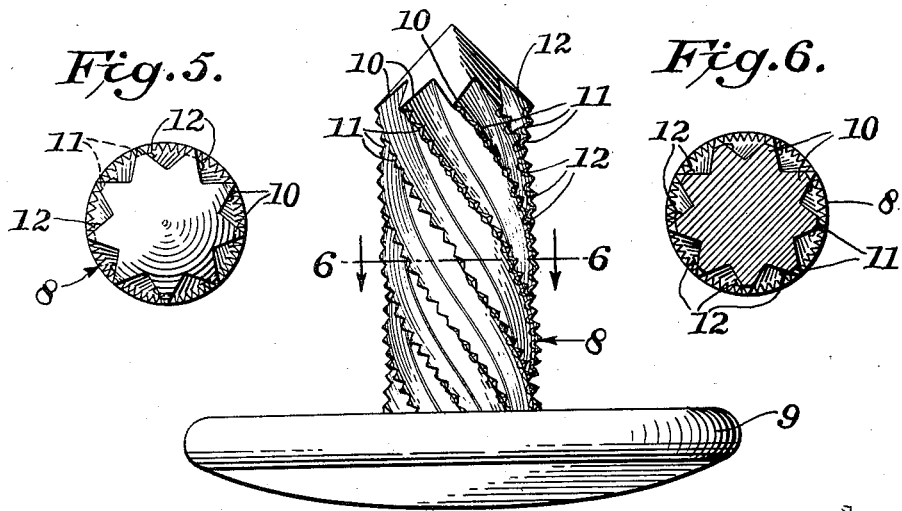

2,314,897

UNITED STATES PATENT OFFICE 2,314,897

FLUTED SHANK FASTENER

Forrest G. Purinton, Waterbury, Conn., assignor to The Patent Button Company, Waterbury, Conn., a corporation of Connecticut Application April 23, 1941, Serial No. 389,963

4 Claims. (Cl. 24—101)

My invention relates to new and useful improvements in fasteners, and more particularly to a tack fastener to be used in holding buttons to garments.

An object of the invention is to provide a tack fastener that is somewhat similar to the tack fastener shown in Patent Number 2,243,017, granted to me, William A. Zwiebel, and Harold N. Verzier on May 20, 1941, for Tack buttons.

The present invention relates to an improvement on this form of fastener so that after the fastener is once driven into its receptive means, it will take a great pulling force to dislodge it therefrom.

A further object of the invention is to provide a tack fastener that is especially adaptable for use with objects made of Bakelite or other hard plastics or even a soft form of steel, the fastener, of course, to be driven into an opening which is several thousandths of an inch less in diameter than the diameter of the fastener.

Still another object of the invention is to provide a fastener which will be provided with spiral flutes of the desired pitch and will also be provided with burrs or serrations or teeth on the under surface (advance) of the respective flutes, so that after the fastener is once driven into a hole of smaller diameter than the diameter of the fastener, it will necessitate a relatively hard pull to ever dislodge the fastener from its object to thus provide a strong and secure fastening means.

With these and other objects in view, the invention consists in certain new and novel arrangements and combination of parts, as will be hereinafter more fully described and pointed out in the claims.

Referring now to the drawing showing a preferred form and one modification,

Fig. 1 is a side elevation of the preferred form of my new fastener;

Fig. 2 is a plan view of the fluted shank viewed from the point end, the dotted circle showing the relative size opening into which the fastener is to be driven;

Fig. 3 is a transverse section on the line 3—3 of Fig. 1 of the shank only;

Fig. 4 is a view similar to Fig. 1 of a slightly modified form;

Fig. 5 is a plan view from the point end of the fastener; and

Fig. 6 is a transverse sectional view on the line 6—6 of Fig. 4 of the stem only.

Referring now for the moment to Fig. 1, illustrating the preferred form of fastener, there is shown the shank 1, which is headed, as at 2, while over the head is placed the usual ornamental cap 3. The shank 1 is pointed, as at 4, so that it will readily pierce the cloth (not shown) when used as a fastener for a button.

The shank 1 is fluted to provide a series of helical ridges 5, and in the present instance I have shown nine of these ridges or flutes. I have also found that the pitch of the helix is preferably about 30°. Of course, the pitch may be varied, if desired, and likewise the number of flutes may be increased or decreased.

The fastener so far described, with the exception of the pitch, is similar to the fastener shown in Patent Number 2,243,017, granted to me, William A. Zwiebel, and Harold N. Verzier on May 20, 1941, for Tack buttons.

However, I have found that by providing a plurality of serrated edges or saw teeth on the under faces of the flutes or by forming burrs on the under sides of the flutes, I can increase the retaining power about 20% over that shown in the aforementioned fastener.

Ordinarily, a tack fastener, when used with a button for retaining purposes, should be able to withstand a two hundred pound pull before the tack or fastener becomes dislodged from the button, and in the present instance, by forming the fastener about to be described, I have found that it will take a substantially greater pull than that above-mentioned to remove the fastener from a button.

Referring again for the moment to Figs. 1 and 3, there is shown a plurality of serrations or saw teeth 6 formed along the ridges of the respective flutes, which teeth also extend along the under surfaces 7 of the respective flutes. This can be accomplished with a simple knurling operation, thus keeping down the manufacturing cost of the fastener. Thus, when the fastener is driven into a Bakelite slug or button (not shown) in which there is an opening (see dotted lines in Fig. 2) of several thousandths of an inch less in diameter than the diameter of the shank, the flutes 5 will cut their own grooves in the wall about the opening and the smooth sides or upper faces of the flutes will bear hardest against the grooves formed in the Bakelite.

Thus, the resistance to forcing this fastener with its spiral flutes into a Bakelite button will be at a minimum but the resistance to pulling the fastener from the slug or button will be at a maximum, due to the fact that in forcing the spirally fluted fastener into the Bakelite, the upper faces of the flutes will bear hardest on the cut walls (grooves), and in the removal of the fastener, the walls (grooves) about the opening in the Bakelite will bear hardest on the under sides of the flutes, which will cause the saw teeth of the under surfaces of the flutes to dig into the Bakelite and thus form a greater resistance to the pull on the fastener.

Referring now for the moment to Fig. 4 showing a modified form, there is also shown a similar fastener having a shank 8, the capped head 9, and the spiral flutes 10. In this instance, rather than forming a series of steps or saw teeth on the under surfaces of the respective flutes, there is shown a plurality of lateral grooves 11 superimposed on the longitudinal or helical ridges or flutes 10. These grooves are preferably formed with knurling rolls, and I have found that when these grooves are cut, there are small burrs 12 formed on the under sides of the flutes. These burrs, in turn, will be forced against the grooves cut in the Bakelite during the driving of the fastener into its opening, so that the burrs will also act as a resistance in preventing the pulling of the tack or fastener from its button.

Thus, the modified form of fastener is similar to the preferred form in that by having the burrs on the under surfaces of the flutes, no material resistance is added to the driving of the fastener within an opening in the button, but any pulling action to remove the fastener from the button will cause the spiral flutes, together with the burrs, to be forced against the side walls of the grooves cut by the flutes into the Bakelite and in this way add to the resisting power of the fastener.

It will be understood that although I have mentioned the fastener as being used with a Bakelite button, it is also to be understood that the same may advantageously be used as a drive screw or fastener for Bakelite or other similar plastics and may even be used with soft metal and in many other places where the standard driving screw is now used.

Finally, it will be understood that although I have shown in one form a plurality of steps or saw teeth and in the other instance circumferentially cut notches and resultant burrs, other small projections might be used on the under surfaces of the flutes to like advantage.

Having thus described my invention, what I claim as new and desire to secure by Letters Patent is:

1. A fastener for buttons and the like including a head, a pointed shank, the said shank provided with spiral flutes and the under surfaces of the said flutes presenting jagged surfaces to thereby add to the holding power of the said fastener after being driven into an opening of slightly less diameter than the diameter of the shank of the fastener.

2. A metal fastener including a head, a shank, the said shank provided with spiral flutes having substantially a 30° pitch and the under surfaces of the said flutes provided with a series of saw teeth surfaces extending to the outer edges of the said flutes to thereby add to the resisting power against removal after the said fastener has been driven into an opening of slightly less diameter than the diameter of the shank of the fastener.

3. A metal tack fastener including a head, a shank, the said shank provided with spiral flutes, a plurality of spaced circumferential grooves cut into said flutes to produce burrs on the under surfaces of the said flutes the said grooves being of less depth than the depth of the flutes and the burrs thereby adding to the resisting power against removal after the said fastener has been driven into an opening of slightly less diameter than the diameter of the shank of the fastener.

4. A metal fastener including a head, a shank, the shank provided with spiral flutes having substantially a 30° pitch and the outer edges of the spiral flutes provided with a series of notches to thereby add to the resisting power against removal after the said fastener has been driven into an opening of slightly less diameter than the diameter of the shank of the fastener.

FORREST G. PURINTON.